(12) United States Patent
Rued

(10) Patent No.: US 10,888,053 B1
(45) Date of Patent: Jan. 12, 2021

(54) IN-GROUND WATER DISTRIBUTION ASSEMBLY

(71) Applicant: Henry W Rued, Willits, CA (US)

(72) Inventor: Henry W Rued, Willits, CA (US)

( * ) Notice: Subject to any disclaimer, the term of this patent is extended or adjusted under 35 U.S.C. 154(b) by 0 days.

(21) Appl. No.: 16/813,505

(22) Filed: Mar. 9, 2020

(51) Int. Cl.
*A01G 27/02* (2006.01)

(52) U.S. Cl.
CPC .................... *A01G 27/02* (2013.01)

(58) Field of Classification Search
CPC ......... A01G 25/00; A01G 25/16; A01G 29/00
USPC .......................................................... 405/36
See application file for complete search history.

(56) References Cited

U.S. PATENT DOCUMENTS

| | | | | |
|---|---|---|---|---|
| 551,646 A * | 12/1895 | Newsom | ............... | E21B 7/061 166/50 |
| 762,589 A * | 6/1904 | Lawrence | ............... | A01G 29/00 47/48.5 |
| 1,512,758 A * | 10/1924 | Gravatt | ............... | A01G 29/00 111/7.2 |
| 1,571,969 A * | 2/1926 | Ruprecht | ............... | A01G 25/00 126/59.5 |
| 1,665,371 A * | 4/1928 | Keys | ............... | B05B 15/74 239/206 |
| 1,778,030 A * | 10/1930 | Kanst | ............... | A01G 29/00 47/48.5 |
| 2,600,752 A * | 6/1952 | Gettins | ............... | A01G 25/00 261/116 |
| 2,985,242 A * | 5/1961 | Papa | ............... | A01G 25/00 169/90 |
| 3,082,606 A * | 3/1963 | Calciano | ............... | A01G 25/16 405/41 |
| 3,100,083 A * | 8/1963 | Wardrup | ............... | A01G 25/16 239/452 |
| 3,166,034 A * | 1/1965 | Haroldson | ............... | A01G 29/00 111/7.3 |
| 3,461,606 A * | 8/1969 | Caloia | ............... | A01G 29/00 47/48.5 |
| 3,659,536 A | 5/1972 | White | | |

(Continued)

FOREIGN PATENT DOCUMENTS

KR          200468193 Y1     8/2013

OTHER PUBLICATIONS

Dripdepot; Deep Drip Watering Stakes; <https://www.dripdepot.com/item/new-deep-drip-watering-stakes-length-8-inch?gclid=Cj0KCQiA_rfvBRCPARIsANIV66NLJbeP0RIWxo96JkG2r_-h0qIX498dN9i-8GfNnKkVzLfesgo3i-caAp1uEALw_wcB> (Year: 2020).*

(Continued)

*Primary Examiner* — Magdalena Topolski
*Assistant Examiner* — Morgan T Barlow
(74) *Attorney, Agent, or Firm* — Lamon Patent Services; Cynthia S. Lamon

(57) ABSTRACT

An in-ground water distribution assembly includes a ground water capture cup with a top rim defining an open end, a location spike fitted to the bottom of the ground water capture cup, the location spike extending downward orthogonally from the bottom of the capture cup, a plurality of vertical support risers connected or seated in riser seats distributed about the inside wall of the capture cup, the vertical risers extending upward and at angle inward toward center of the capture cup and fitted to a vertical feeder tube, and a water pressure flow regulator having an inline feeder nozzle and an egress pressure valve mechanism connected to the feeder tube at top center of the assembly.

11 Claims, 9 Drawing Sheets

(56) References Cited

U.S. PATENT DOCUMENTS

| | | | | |
|---|---|---|---|---|
| 3,857,196 | A * | 12/1974 | Alkire | A01G 25/00 47/48.5 |
| 4,031,009 | A * | 6/1977 | Hicks | E03F 1/002 210/164 |
| 4,060,991 | A * | 12/1977 | Reese | A01G 25/06 405/36 |
| 4,123,980 | A * | 11/1978 | Winston | A01G 29/00 111/92 |
| 4,350,296 | A | 9/1982 | Kuhlman et al. | |
| 5,213,261 | A * | 5/1993 | Rosenberg | B05B 15/68 239/99 |
| 5,558,030 | A * | 9/1996 | Ward | A01C 23/026 111/7.2 |
| 5,761,846 | A | 6/1998 | Marz | |
| 5,996,279 | A | 12/1999 | Zayeratabat | |
| 7,040,840 | B2 * | 5/2006 | Zook | E03F 1/002 137/395 |
| 8,978,296 | B2 * | 3/2015 | Zinger | A01G 29/00 47/48.5 |
| 9,004,812 | B2 * | 4/2015 | Muir | E02B 11/005 405/36 |
| 9,044,766 | B2 * | 6/2015 | Anderton | B05B 1/044 |
| 9,169,944 | B1 * | 10/2015 | Dunn | F16K 11/0853 |
| 9,380,748 | B2 * | 7/2016 | Nallakrishnan | A01G 13/0206 |
| 9,648,810 | B2 * | 5/2017 | Alfawaz | A01G 29/00 |
| 10,091,956 | B2 | 10/2018 | Gietl | |
| 10,335,821 | B2 * | 7/2019 | Schneider | B05B 15/658 |
| 10,602,684 | B2 * | 3/2020 | Natkiel | A01G 27/008 |
| 2002/0162908 | A1 | 11/2002 | Parod et al. | |
| 2003/0017001 | A1 * | 1/2003 | Ogi | A01G 29/00 405/36 |
| 2008/0277489 | A1 * | 11/2008 | Townsend | A01G 25/00 239/7 |
| 2011/0017845 | A1 * | 1/2011 | Crist | A01G 25/16 239/569 |
| 2016/0286745 | A1 * | 10/2016 | Riffe | A01G 29/00 |
| 2018/0035621 | A1 | 2/2018 | Allen | |

OTHER PUBLICATIONS

Amazon; Tree I.V. https://www.amazon.com/Tree-I-V-5-Gal-Seeker-Package/dp/B00MZHRFOK/ref=asc_df_B00MZHRFOK/?tag=hyprod-20&linkCode=df0&hvadid=167104011641&hvpos=1o22&hvnetw=g&hvrand=497540837920701558&hvpone=hvptwo=&hvqmt=&hvdev=c&hvdvcmdl=&hvlocint=&hvlocphy=9032366&hvtargid=pla-304843006500&psc=1 (Year: 2020).*

A.M. Leonard Horticultural Tool and Supply Co.; Root Flow Watering and Aeration Tube, Small; Nov. 19, 1996 (Year: 1996).*

* cited by examiner

IN-GROUND WATER DISTRIBUTION ASSEMBLY

CROSS-REFERENCE TO RELATED DOCUMENTS

[NA]

BACKGROUND OF THE INVENTION

1. Field of the Invention

The present invention is in the field of agricultural cultivation including in-ground gardening and pertains particularly to methods and apparatus for watering plants.

2. Discussion of the State of the Art

Conservation of water is an important factor in agricultural cultivation relative to farmed crops, fruit or nut bearing trees, vineyards and other agriculture mediums. Water sources tapped to water agricultural ground may include water diversion canals, underground wells, above ground collection tanks, natural streams or rivers. Water delivery vehicles that spray or otherwise emit water over crops have been developed that roll along the crop rows and distribute a measured flow of water diffused out over the crop. In some cases water from a standing or flowing source like a pond or canal is pumped through smaller channels cut on either side of a row of plants or through plastic piping or tubing typically laid on the ground or elevated above the ground.

Landscaping and gardening watering utilities may include drip line systems, soak line systems, sprinkler systems, etc. Such systems may be designed to distribute water evenly from a geometric perspective over a general area requiring water. While these systems may include water pressure regulators and other types of water conservation devices and selectable settings to conserve water, many of these systems still waste water. Water waist may occur because water may be inadvertently directed to ground that is not hosting a root system leaving less water for ground holding a root system.

In the watering systems mentioned above, determining if watering is economically efficient or no may be a direct function of the knowledge and experience of the user in setting watering coverage areas, determining best timing to water, and determining the appropriate length of automated watering periods as well as regulating the flow of water from a water source. Some of these watering systems include smart sensor technologies that can be manipulated to regulate watering time or amount based on environmental conditions detected by the sensor system. For example, delaying a watering period due to it raining or shortening a watering period due to excessive heat. These systems also are difficult to set and maintain and can be expensive features added to a timing system for a watering system. Therefore, what is clearly needed is a watering system and apparatus that conserves water directly and that may optimize soak time for root systems or root balls of the watered plant.

BRIEF SUMMARY OF THE INVENTION

An in-ground water distribution assembly is provided and includes a ground water capture cup having an overall diameter and height, a closed bottom end and a top rim defining an open end, a location spike fitted to the bottom of the ground water capture cup at proximal center of the cup bottom, the location spike extending downward orthogonally from the bottom of the capture cup, a plurality of vertical support risers connected or seated in riser seats distributed in an equally-spaced bolt circle pattern about the inside wall of the capture cup, the vertical risers extending upward and at angle inward toward center of the capture cup, the vertical risers fitted to a vertical feeder tube held vertical above center of the capture cup, and a water pressure flow regulator having an inline feeder nozzle, an internal volume, and an egress pressure valve mechanism, the flow regulator connected to the vertical feeder tube at top center of the assembly.

In one embodiment, the in-ground water distribution assembly further includes at least one vertical barrier rotatably seated on the top rim of the capture cup, the barrier functioning as a shield to prevent ground water progression through soil, loam, or other ground medium past the inside wall thereof. In one embodiment, the vertical barrier is a half-round vertical shield having a bottom rim of approximately the same radius as the capture cup rim, the bottom rim adapted to interface with the top rim of the capture cup in a rotatable manner. In another embodiment, the vertical barrier is a rectangular sheet vertical shield attached or otherwise formed orthogonality to a half-round bottom ring of approximately the same radius as the capture cup rim, the bottom ring adapted to interface with the top rim of the capture cup in a rotatable manner.

In one embodiment, the vertical risers number three vertical risers seated to like number of riser seats around the inside wall of the capture cup at one hundred and twenty degree equal spacing. In one embodiment, the in-ground water distribution assembly is connected to a feeder line at the inline feeder nozzle, in turn, connected to a capped water supply line or source.

In one embodiment, the capture cup functions as a barrier to downward progression of ground water past the inside wall thereof. In another embodiment, the capture cup and the half-round barrier function together to prevent downward progression of ground water and lateral progression of ground water in one direction. In a further embodiment, the capture cup and two rectangular sheet barriers function together to prevent downward progression of ground water and lateral progression of ground water in two directions.

DETAILED DESCRIPTION OF THE INVENTION

In various embodiments described in enabling detail herein, the inventor provides a unique ground water distribution device that conserves water and enables pointed direction for the underground distribution of said ground water. The present invention is described in enabling detail using the following examples, which may describe more than one relevant embodiment falling within the scope of the present invention.

A goal of the present invention is to create a ground water distribution device that conserves water by distributing ground water in one or more planned directions where such direction or directions are configurable to the assembly by a user operating the ground water distribution device. Another goal of the invention is to create a ground water distribution device that may be hooked up to a water line or other water source employing readily available components associated with current line watering products.

Figure 1:
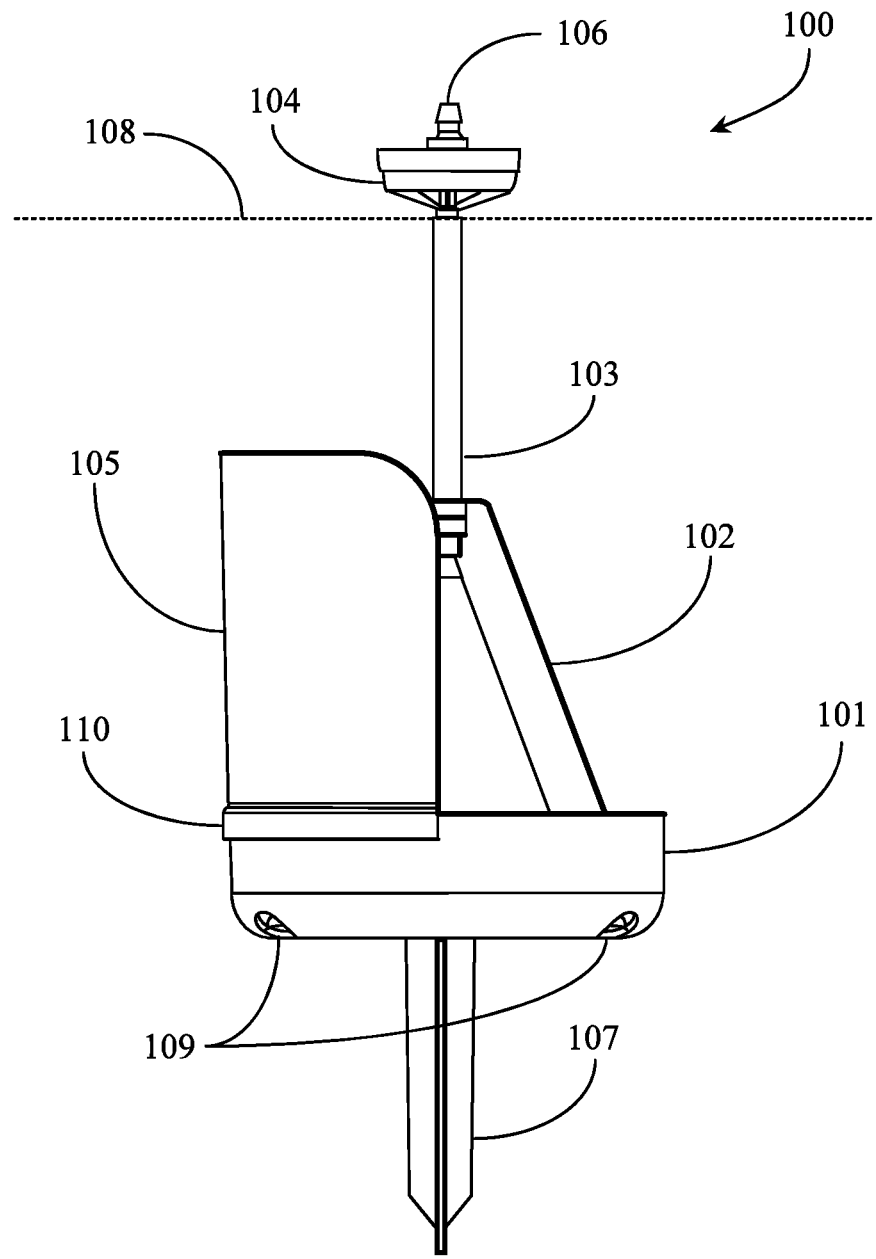
FIG. 1 is a side elevation view of a ground water distribution assembly according to an embodiment of the present invention.

FIG. 1 is a side-elevation view of a ground water distribution assembly 100 according to an embodiment of the present invention. Ground water distribution assembly 100 is adapted as a partially underground water receiver and distributor to adjacent plants including trees, shrubs, flowers, vines, and garden vegetables. Ground water distribution assembly 100 is installed in ground below a ground surface depicted herein as horizontal surface line (broken) 108.

Ground water distribution assembly 100 is strategically positioned below ground surface 108 and adjacent to plants using an assembly location spike 107. Location spike 107 may be a plastic molded garden spike with three blades or another spike configuration without departing from the spirit and scope of the invention. Ground water distribution assembly 100 includes a water capture cup 101. Water capture cup 101 may be a relatively shallow, plastic-molded annular cup having a center recess (not visible) shaped for receiving the top-end of location spike 107. Capture cup 101 may have a circular bottom and a relatively thin annular wall. The overall diameter, height and volume of capture cup 101 may vary according to the amount of ground water distributed, which may be a factor of what types of plants are being watered by Ground water distribution assembly 100.

Capture cup 101 serves as a base structure to which other components may be installed. Capture cup 101 has a primary function, which is to delay the normal downward progression of seeping water through soil, loam, or other planting mediums. Ground water distribution assembly 100 includes a water flow regulator cup 104, hereinafter termed regulator cup 104. Regulator cup 104 may be an annular plastic molded part having an internal volume that fills with water fed from a feeder line. An egress valve mechanism (not visible) may be provided to regulator cup 104 that will open, in this embodiment, at or above 15 pounds of line pressure (water pressure).

Water flow pressure regulators are common in the art and known to the inventor. Regulator cup 104 supports a central water line nozzle 106, which may be adapted in size to fit standard plastic water feeder lines that may in turn be installed at the far ends to a larger diameter water line or water source depending on water distribution architecture and number of ground water distribution assemblies. In one embodiment, water line nozzle 106 is adapted to accept a polyurethane or standard polymer or rubber water feeder hose of approximately one-quarter-inch in diameter.

Regulator cup 104 has connection from the valve mechanism to a centrally-oriented vertical feeder tube 103. Vertical feeder tube 103 may be a plastic or rubber composite tubing approximately one-quarter-inch diameter tubing in this embodiment. It is noted herein that elements of ground water distribution assembly 100 may be scaled up or down in size representation without departing from the spirit and scope of the present invention. Regulator cup 104 is maintained above ground surface level 108. Ground surface level 108 may be more mound like with ground water distribution assembly 100 buried within the mound, the mound adjacent to plants being watered.

Ground water distribution assembly 100 includes a half-round water shield 105. Water shield 105 may be fabricated form plastic tubing and has a split rim interface 110 of the same nominal radius as the rim of capture cup 101. Half-round water shield may be urged around the upper rim wall of capture cup 101. Half-round water shield 105 prevents water from traveling to ground space blocked by the vertically rising shield wall. Contrarily, the area of ground not blocked by half-round water shield 105 receives more distributed water because of the water concentration and directive attributes of the shield. In this case, half-round shield 105 has curved corners at the top. The wall thickness of half-round water shield 105 may be the same or similar in thickness dimension to the annular wall of capture cup 101.

Ground water distribution assembly 100 includes three vertical riser supports 102 (one visible). Vertical riser supports 102 functions as physical support pieces for holding vertical feeder tube 103 and regulator cup 104 elevated and roughly at a center position above capture cup 101. Riser bottom seats (not visible) are provided in 120-degree pattern position (three parts) around the inside of capture cup 101. Riser bottom seats may be assembled to capture cup 101 using typical hardware fasteners 109 in the form of a screw and washer or other fastener combination. Capture cup 101 has a solid bottom that delays the seeping ground water from progressing further downward below the assembly, where the water is unable to benefit plant growth.

Risers 102 (one visible) include three separate components having an elongated rectangular profile and a thickness dimension substantially smaller than the width dimension of the part. The separate risers include a bottom riser that may be fitted over tubing 103 at the bottom of the tube. The bottom riser is the shortest of the three risers. A middle riser is slightly longer than the bottom riser. A top riser is the longest of the three pieces. More detail about risers 102 and how they are seated to support tubing 103 and flow regulator cup 104 is provided later in this specification.

Figure 2:
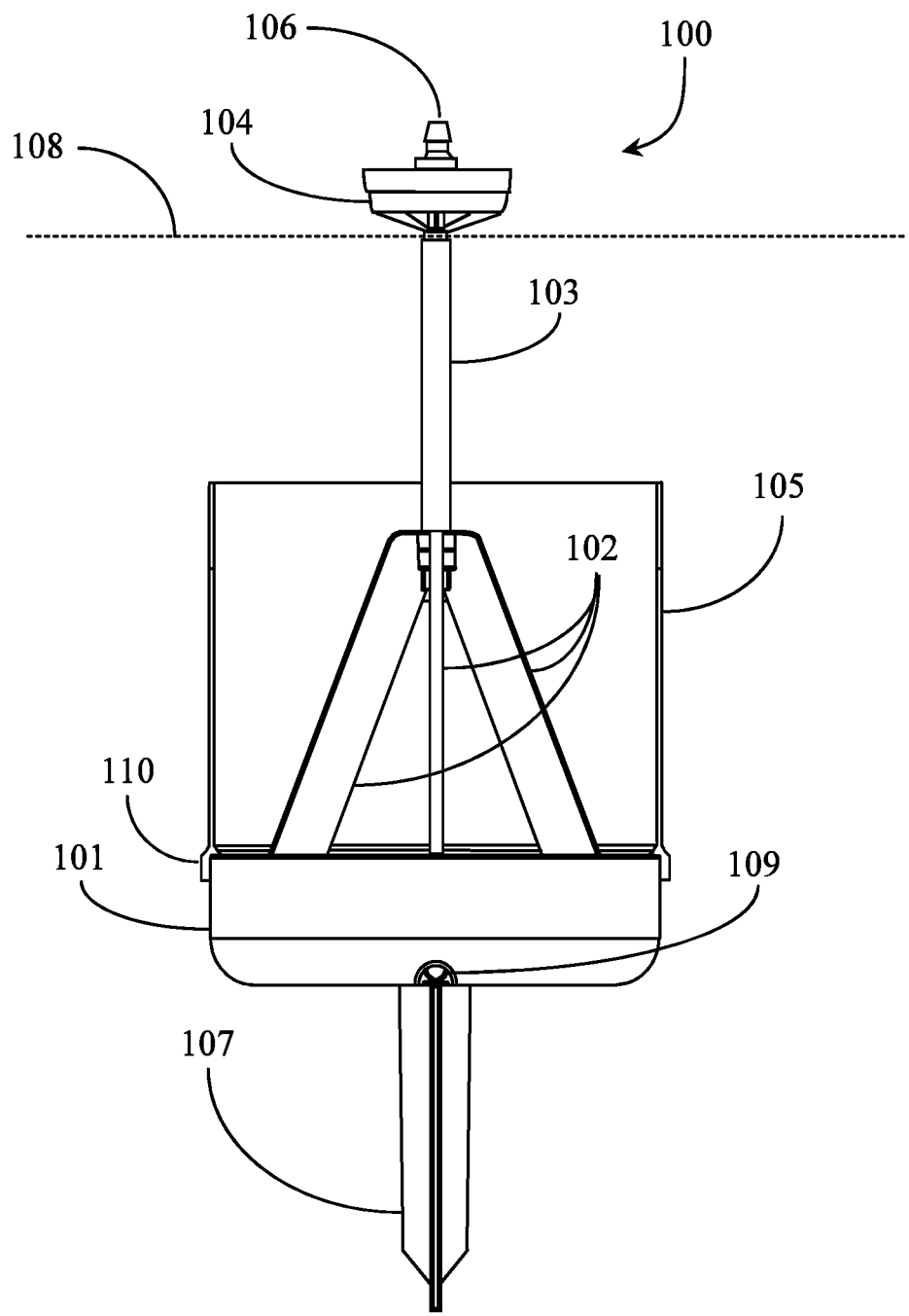
FIG. 2 is a front elevation view of the ground water distribution assembly of FIG. 1.

FIG. 2 is a front-elevation view of ground water distribution assembly 100 of FIG. 1. In this view of ground water distribution assembly 100, all three vertical risers 102 are visible with half-round shield 105 on the rear side of ground water capture cup 101. Half-round shield 105 may be urged about the rim of capture cup 101 in a clockwise direction or in a counter-clockwise dimension before filling the installation pocket with soil. Therefore, ground water distribution assembly 100 is mostly buried below ground surface 108. Ground surface 108 may appear as a mound surface built up over the normal surface elevation of the ground where ground water distribution assembly 100 is used. Ground water distribution assembly 100 may also be used successfully on terraces and on sloping ground without departing from the spirit and scope of the present invention.

A feeder line (not illustrated) may be connected to water line feeder nozzle 106. When 15 pounds of water pressure is reached, the bottom valve mechanism in flow regulator cup 104 opens allowing water to egress cup 104 and travel vertically downward through vertical feeder tube 103. The feeder tube carries the water down into the soil and distributes peripherally outward soaking more ground as more water is distributed. Half-round shield 105 blocks the water soak at the inside vertical surface thereof. The ground water soaks more ground away from the shield and above the capture cup because of the shield placement on the rim of capture cup 101 and because of the sponge like properties of dry soil. Water progressing into the capture cup has nowhere to go but back up and out as soil dries enough to absorb more of the water.

The function of water soak is dry ground giving the water a direction to progress. The capture cup 101 is important for keeping water, which naturally progresses more strongly downward because of gravity, from moving any lower in the ground than the cup. Capture cup 101 will hold any excess water if the surrounding ground is already soaked. As the soil begins to dry again, more water will be absorbed out of capture cup 101 is a direction away from the inside vertical wall of half-round shield 105. After installing ground water distribution assembly 100 with a shield in position, a user may at a later time remove enough top-soil from the installation to access the shield and top rim of capture cup 101. The user may then urge the shield clockwise or counterclockwise to reset the shield position on the cup rim if required or desired.

Figure 3:
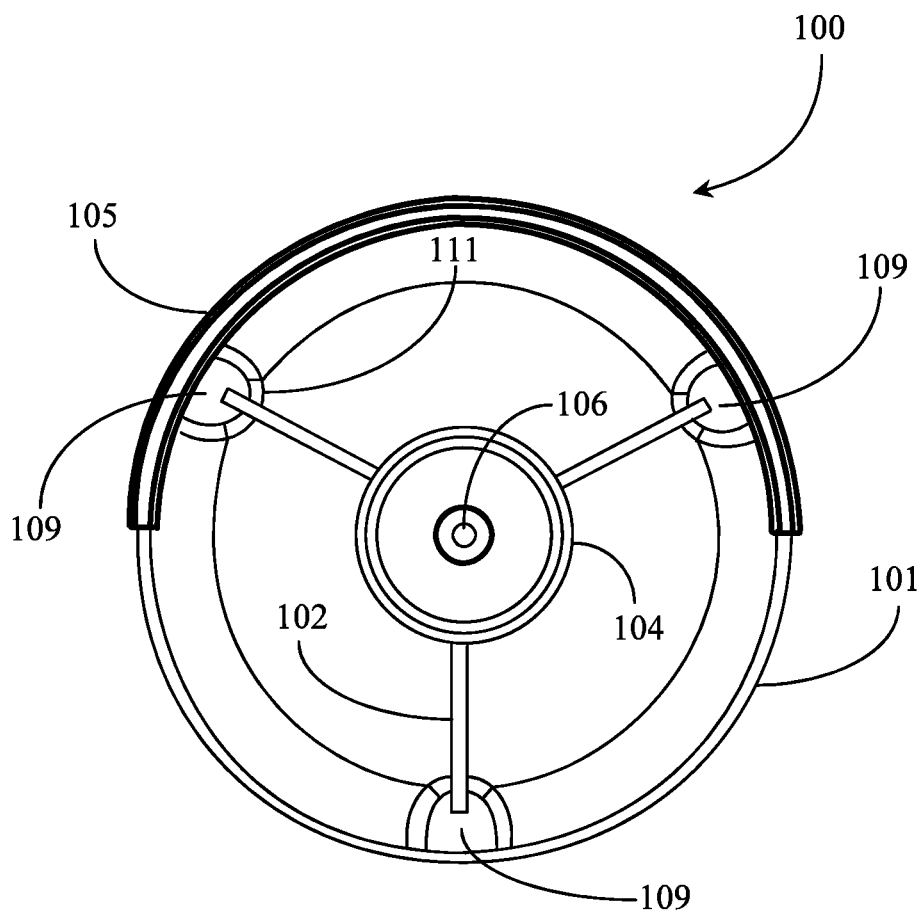
FIG. 3 is an overhead view of the ground water distribution assembly of FIG. 2.

FIG. 3 is an overhead view of ground water distribution assembly 100 of FIG. 2. In this view, the 120-degree pattern placement of vertical risers 102 is visible. Riser seats 111 are provided in this embodiment and are adapted to seat the bottoms of risers 102. Riser seats 111 may be contoured molded parts molded of plastic or another polymer. In one embodiment, riser seats 111 are contiguous relative to material with ground water capture cup 101 and may be molded together with the cup in a same mold. In one embodiment they are separate components installed in place through the bottom of capture cup 101 using hardware like fasteners 109.

In this view looking down on the installation, only the water flow regulator cup 104 and the feeder line nozzle 106 would be visible to a user. In one embodiment, once the valve mechanism on flow regulator cup 104 opens, water progresses out of the cup through the vertical tube and is distributed out of the bottom of the tube. In this regard, capture cup 101 and half-round shield 105 functions as moisture barriers to moisture advancing to any ground beyond those elements in the installation. In one embodiment, a diffuser well (not illustrated may be installed at the bottom end of vertical tube 103 wherein the tube bottom end is capped, and the diffuser well includes a perforated sidewall to uniformly distributes the water outward more laterally.

It is noted herein that water distribution may also be affected by soil dryness level and strategic barriers (capture cup and shield to urge more of the moisture in the desired direction for soaking ground containing the plants as opposed to soaking ground without return thereby wasting water. A timer may be employed to periodically deliver water through a main water line and feeder line to the ground water distribution assembly 100. Watering periods controlled by automated timers may be adjusted for less watering time due to conservation of the distributed water by the capture cup and shield of the ground water distribution assembly 100.

Figure 4:
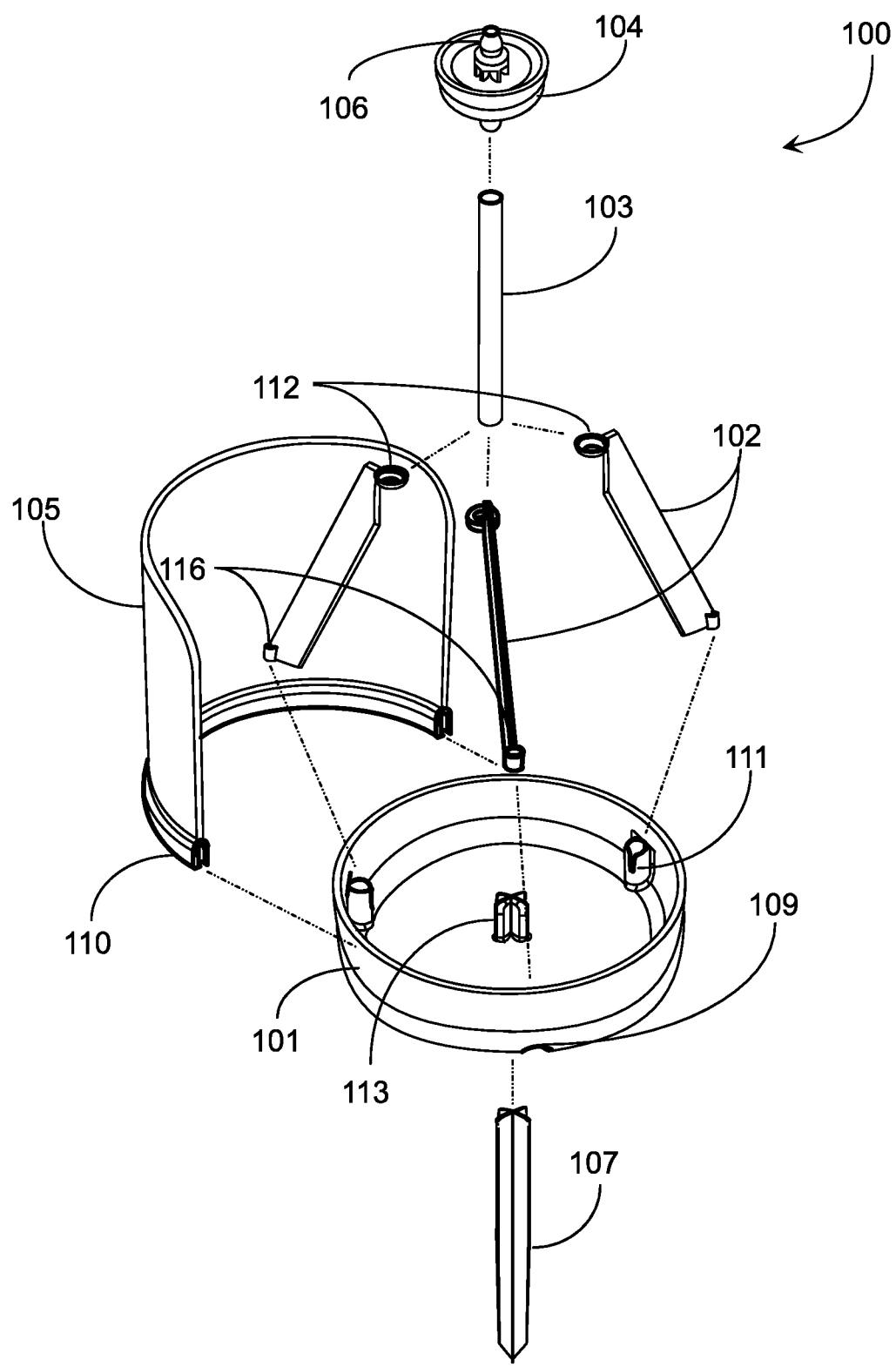
FIG. 4 is an exploded perspective view of the ground water distribution assembly of FIG. 1 depicting individual elements thereof.

FIG. 4 is an exploded, perspective view of ground water distribution assembly 100 of FIG. 1 depicting individual elements thereof. In this embodiment, location spike 107 has four spike blades that culminate to a point. Capture cup 101 includes a location spike attachment recess 113 located at approximately center of the cup. Spike attachment recess 113 may be a molded feature of capture cup 101. Spike attachment recess 113 has an architectural configuration that enables location spike 107 to be pressed into recess 113 from position beneath the bottom of capture cup 101. Witness lines are meant to show general, direction of component assembly interface.

Riser seats 111 (two visible) are spaced apart to approximately 120 degrees. Vertical risers 102 angle inward from seats 111 toward center roughly at a 45-degree angle. The upper ends of vertical risers 102 are angle cut to accommodate interface against vertical tube 103. Risers 102 include bottom ring features 113. Bottom feature 113 may be a ring or a post, or another like feature that may interface with a feature in or on riser seats 111.

Each vertical riser includes a hoop feature 112 adapted to fit over vertical feeder tube 103. In one embodiment, the bottom, middle, and top riser present top rings in different elevations but all parts are the same overall length. In another embodiment, the overall lengths are graduated the bottom vertical riser being shortest and the top vertical riser being the longest vertical riser. Half-round shield 105 may be placed on the rim of capture cup 101 after the vertical risers, vertical feeder tube and flow regulator cup are in place. Rim interface 110 has opposing wings that fit over the rim of capture cup 101 and are of enough depth to keep the shield in place on the cup. After assembly and location placement, the user may fill the space and connect a water line to nozzle 106.

Figure 5A:
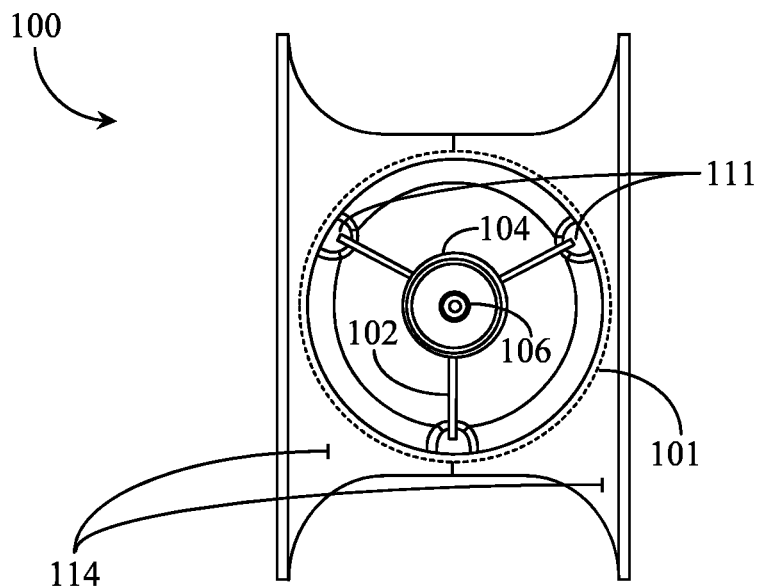
FIG. 5A is an overhead view of the ground water distribution assembly of FIG. 1 with flat shields added according to another embodiment of the present invention.

FIG. 5A is an overhead view of ground water distribution assembly 100 of FIG. 1 with flat shields added according to another embodiment of the present invention. In this embodiment, a flat and vertical shield 114 may be installed to the rim of capture cup 101 to achieve a different goal in the direction of ground water distribution.

In this embodiment, ground water distribution assembly 100 includes two flat ground water shields 114 each part a duplicate of the other. Ground water shield 114 has an annular base of the same radius as the rim of capture cup 101 and of the same or similar design as rim interface 110 described above with reference to FIG. 4. In this embodiment, flat shields 114 are oriented to block water distribution to ground areas on the left or right side. However, both areas of ground immediately above and immediately below ground water distribution assembly 100 are not vertically blocked from receiving ground water in this overhead view. In one embodiment, a user may install only one flat shield 114 onto capture cup 101. Having a base design like the half-round shield, flat shield 114 may be urged about the rim of capture cup 101 in a clockwise or counter-clockwise direction. Vertical risers 102, tube 103 and flow regulator cup 104 are not affected by the presence of or no presence of a ground water shield.

Figure 5B:
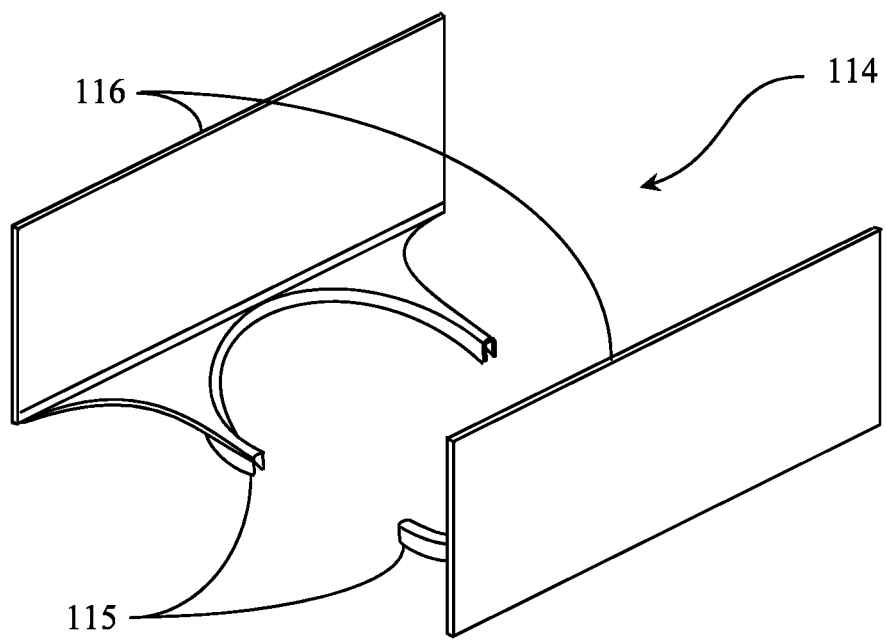
FIG. 5B is a perspective view of the flat shields of FIG. 5A.

FIG. 5B is a perspective view of flat shields 114 of FIG. 5A. Shields 114 are the same part. Shield 114 includes a vertical rectangular barrier and an interface 115 synonymous with interface 110 described further above with half-round shield 105. The difference in using a round shield and a flat shield is that two round shields on one assembly keep all of the water in the capture cup and no plants receive water while the use of two flat shields 114 allow water to progress laterally in two opposing directions. Flat shields 114 may be rectangular sheets assembled to or otherwise formed contiguously with the half-round ring adapted to fit over the top rim of a capture cup 101.

An example spike location for ground water distribution assembly 100 may be in between two plants whether in line with the plant or in a row between plant rows. Flat shield 114 may be a plastic molded component. Although components described herein may be fabricated largely of plastic or a polymer material, the same components may also be manufactured of aluminum or stainless steel or other durable materials without departing from the spirit and scope of the present invention.

Figure 6:
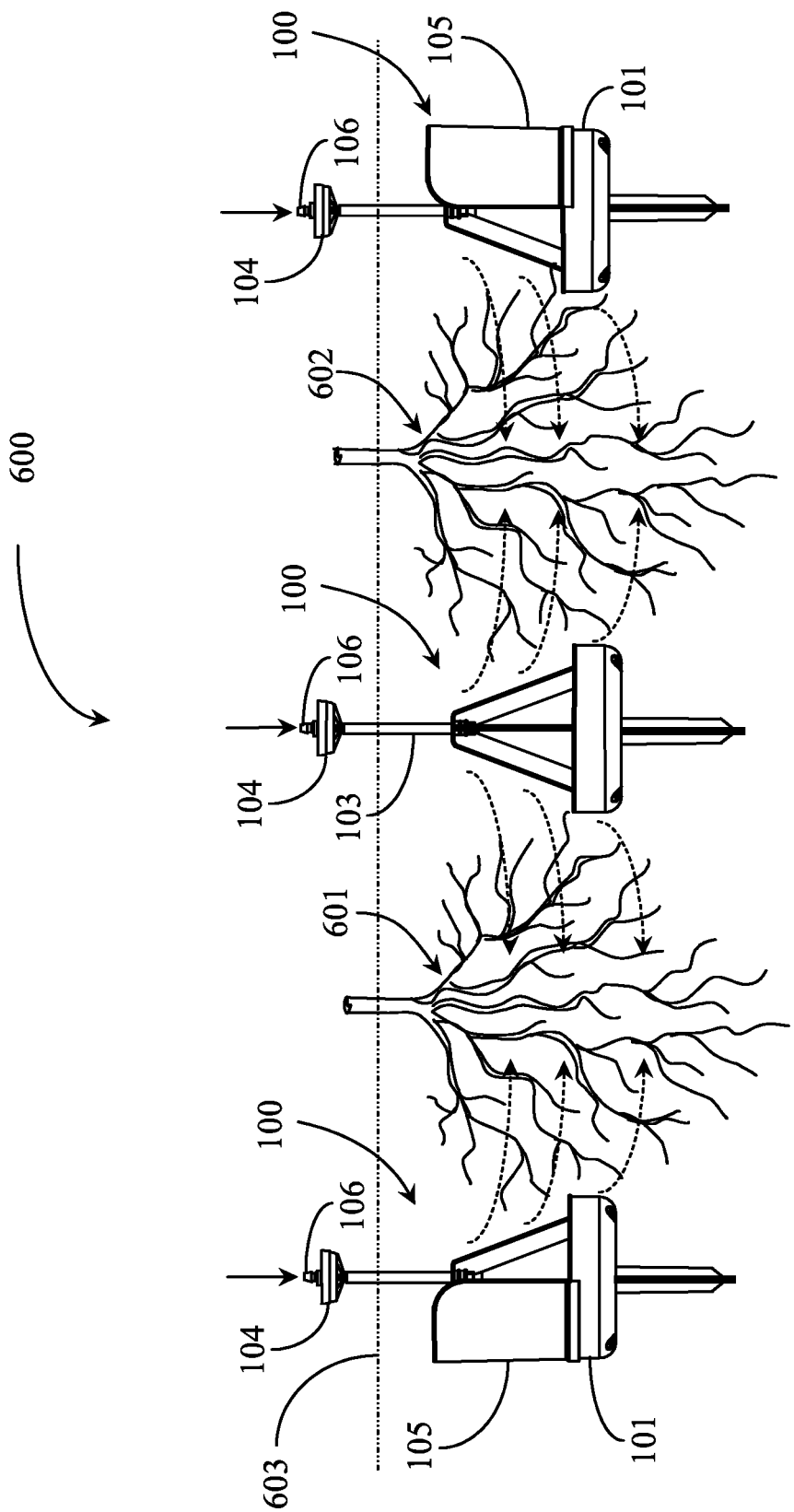
FIG. 6 is an elevation view of multiple ground water distribution assemblies 100 arranged in a linear position to distribute underground water to plants.

FIG. 6 is an elevation view 600 of multiple ground water distribution assemblies arranged in a linear position to distribute underground water to plants. View 600 depicts three ground water distribution assemblies 100 and two plants 601 and 602. Assuming for the purpose of this description that the plants and assemblies are in a row, to the left, assembly 100 is partially buried below ground surface 603, with a half-round shield 105 rotated to the side of the assembly facing away from plant 601. This spike location and shield position prevents ground water from saturating any ground on the away side of the assembly or directly below the assembly.

In the center of this view is a ground water distribution assembly having no shield. In this case of no shield, ground water distribution may progress laterally in all directions distributing ground water to plant 601 on one side of the assembly and to plant 602 on the other side of the assembly. Capture cup 101 delays downward progression of ground water below the assembly keep more ground water at a higher elevation so that lateral distribution is more concentrated and lasts longer. In this location there may be a plant in front of the center assembly and behind the center assembly that would also receive water. Therefore, a ground water distribution assembly with no shield is ideal for a space of ground surrounded by plants such as at a cross point between vertical and horizontal rows of plants where four plant may receive ground water.

Groundwater distribution assembly 100 on the right side of this elevation view is identical to the one far left. Half round shield 105 is simply rotated to the side of the assembly away from the plant. It is assumed herein that if a shield is used then ground on the opposite side of the shield from the assembly is not to receive ground water. In the case of flat shields, two shields might be used to direct ground water lateral distribution toward the more open areas of the assembly typically, opposing sides of an assembly. In one embodiment, it may be advantageous to bury the assemblies in mounds elevated slightly above the adjacent plants so that distribution of the ground water is lateral and downward naturally but in the vicinity of the root ball of the plant as opposed to directly beneath the assembly. In this implementation, water from a line feeder flows into the assembly flow regulator 104 and vertical tube 103 in the direction of the arrows for each assembly 100.

Figure 7:
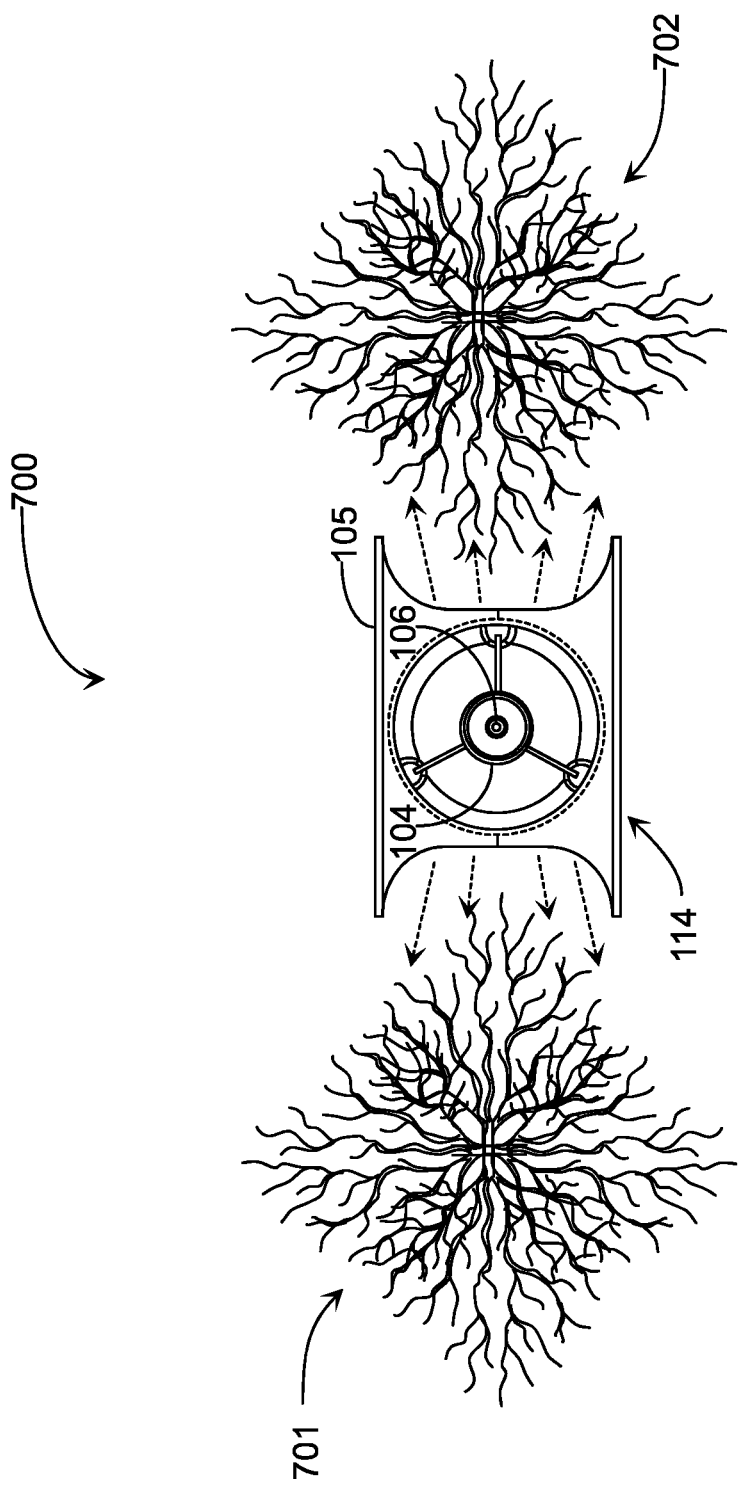
FIG. 7 is an overhead view of the ground water distribution assembly of FIG. 5A distributing water to plants.

FIG. 7 is an overhead view of ground water distribution assembly 700 distributing water to plants. Ground water distribution assembly 700 is spike located and installed in between a plant 701 and a plant 702. Assembly 100 has two flat ground water shields installed on the rim of capture cup 101. In this embodiment, shields 114 are rotated such that the parallel rectangular water barriers are sufficiently linear with the plants to leave the open areas of the ground water distribution assembly adjacent to each plant. In this implementation, it is noted that the ground space on either side of the assembly past the vertical shields 114 is considered waist area. Shields 114 delay the progression of the ground water directly below the assembly and on opposite outer sides of the barriers. Ground water soaking progresses in the direction of the arrows.

Figure 8:
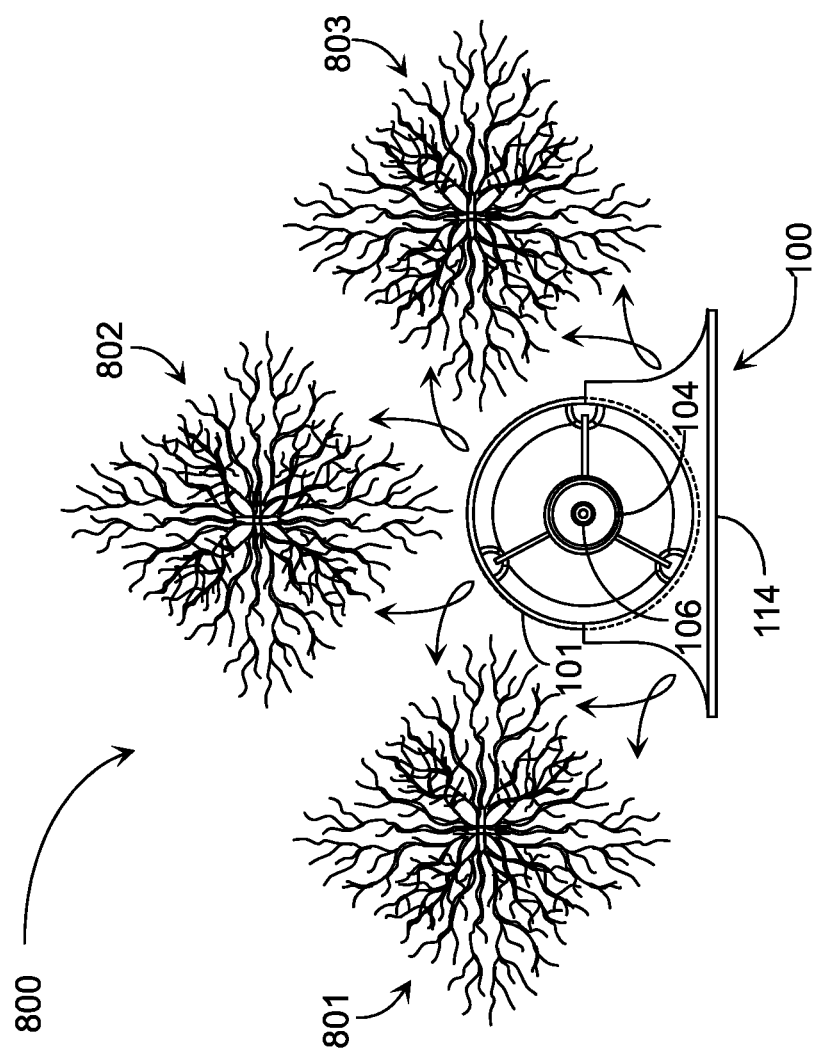
FIG. 8 is an overhead view of the ground water distribution assembly of FIG. 5A with one shield removed to distribute water to multiple plants.

FIG. 8 is an overhead view 800 of ground water distribution assembly 100 of FIG. 5A with one shield removed to distribute water to multiple plants. View 800 include three plants or plant 801, plant 802, and plant 803 in a stagger pattern with the center plant out of linearity with the other two plants. In this case ground water distribution assembly 100 only includes one flat shield 114 positioned on the side of the assembly away from the three plants. In this implementation ground water is delayed in capture cup 101 and is prevented from progressing laterally past the rectangular barrier rotated to the far side of the assembly. Ground water is distributed and progresses laterally in the directions of the arrow features representing ground water directional distribution to plants 801, 802, and 803.

Figure 9:
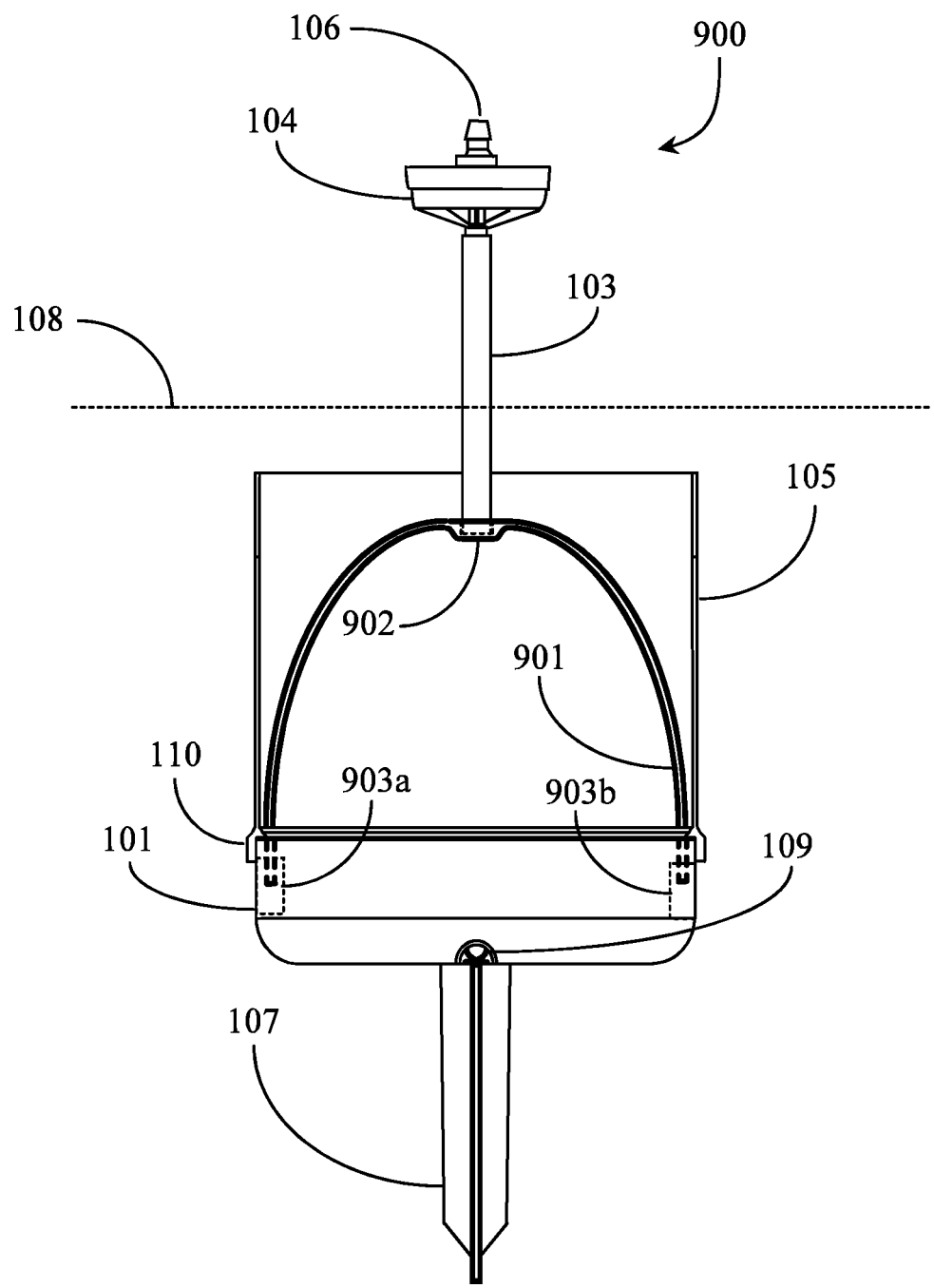
FIG. 9 is a front elevation view of a ground water distribution assembly requiring fewer components than the ground water distribution assembly of FIG. 1.

FIG. 9 is a front elevation view of a ground water distribution assembly 900 requiring fewer components than the ground water distribution assembly of FIG. 1. One goal of the present invention is to provide an underground distribution device that is relatively simple for a home user to set up. Ground water distribution system 900 is analogous in description and function to ground water distribution system 100 of FIG. 1 with the exception of the architecture that supports the placement of and positioning of vertical feeder tube 103.

Referring now back to FIG. 1, ground water distribution assembly 100 includes three riser components 102 arrayed in a 120-degree spacing pattern and having connection at center with vertical feeder tube 103. Each of these riser components must be assembled manually to the vertical feeder tube and to three riser seats provided in the capture cup 101.

Referring now back to FIG. 9, ground water assembly 900 includes a one-piece materially contiguous riser component 901. Riser component 901 may be generally rectangular and bowed by molding, heat forming, or by physical manipulation under a natural spring tension. Riser component 901 may be a polymer based material or a metallic non-corrosive material like steel. Riser component 901 has two polar ends defining two substantially parallel shorter edges, two parallel longer edges, and a relatively thin material thickness.

In this view, riser component 901 is positioned within capture cup 101 by inserting the polar ends into provided riser seats 903*a* and 903*b* formed or otherwise installed at the inside wall of the cup in the same polar arrangement of 180 degrees separation. Riser component 901 has a width dimension that may be similar to the width dimension of separate risers 102 previously described above. The width dimension of riser component 901 may be narrowest at the ends inserted into risers 903*a* and 903*b* and widest at top center of the bowed form where it interfaces with vertical feeding tube 103.

In one embodiment, an annular form recess 902 is provided at top center of riser 901 to receive the lower end of vertical feeding tube 103 either by press fit or snap in interface. Form recess 902 may be a contiguous feature created during molding or it may be a separate part that may be attached to the top center position of riser 901. In one embodiment, form recess 902 may have a greater depth than illustrated herein without departing from the spirit and scope of the invention.

Riser component 901 may be manually installed in risers 903*a* and 903*b* before a shield 105 is installed and before the vertical feeding tube and the top regulator cup 104 are installed. Ground surface line 108 may be just below the base of the water flow regulator cup 104. Ground surface line 108 may also form a hill where water flow regulator cup is at top. In another embodiment, assembly 900 like assembly 100 may be installed vertically on a slope or terraced hill without departing from the spirit and scope of the invention.

It will be apparent to one with skill in the art that the ground water distribution assembly of the invention may be provided using some or all the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The Uses and methods depicted within this description are purely emblematic of definitive ways in which to build and operate this invention and are not to be understood to be limiting of scope in any way. While the uses and methods have been described with a certain degree of particularity, it is to be noted that many alterations could be made in the details of the construction and the arrangement of the apparatus and its components without departing from the spirit and scope of this invention. It is implied that the uses and methods are not limited to the examples represented in this specification for the purpose of clarification and persuasion. The invention is limited only by the breadth of the claims below.

The invention claimed is:

1. An in-ground water distribution assembly comprising:
   a ground water capture cup having an overall diameter and height, a closed bottom end and a top rim defining an open end;
   a location spike fitted to the bottom of the ground water capture cup at proximal center of the cup bottom, the location spike extending downward orthogonally from the bottom of the capture cup;
   at least one vertical support riser connected to or seated in at least one respective riser seat distributed in an equally-spaced bolt circle pattern about the inside wall of the capture cup, the at least one vertical support riser extending upward from the respective riser seat in the capture cup and toward center of the capture cup, the at least one vertical support riser fitted to a vertical feeder tube held vertical above center of the capture cup, and
   a water emitter connected to the vertical feeder tube at top center of the assembly.

2. The in-ground water distribution assembly of claim 1, further including at least one vertical barrier rotatably seated on the top rim of the capture cup, the barrier functioning as a shield to prevent ground water progression through soil, loam, or other ground medium past the inside wall thereof.

3. The in-ground water distribution assembly of claim 2, wherein the at least one vertical barrier is a half-round vertical shield having a bottom rim of approximately the same radius as the capture cup rim, the bottom rim adapted to interface with the top rim of the capture cup in a rotatable manner.

4. The in-ground water distribution assembly of claim 3, wherein the capture cup and the half-round vertical shield function together to prevent downward progression of ground water and lateral progression of ground water in one direction.

5. The in-ground water distribution assembly of claim 2, wherein the at least one vertical barrier is a rectangular sheet vertical shield attached or otherwise formed orthogonally to a half-round bottom ring of approximately the same radius as the capture cup rim, the bottom ring adapted to interface with the top rim of the capture cup in a rotatable manner.

6. The in-ground water distribution assembly of claim 5, wherein the at least one vertical barrier comprises two rectangular sheet vertical shields, wherein the capture cup and the two rectangular vertical shields function together to prevent downward progression of ground water and lateral progression of ground water in two directions.

7. The in-ground water distribution assembly of claim 2, further comprising a feeder line directly connected with the water emitter, the feeder line in turn connected to a capped water supply line or source.

8. The in-ground water distribution assembly of claim 1, wherein the at least one vertical support riser comprises three vertical support risers seated in the same number of riser seats around the inside of the capture cup one hundred and twenty degree equal spacing.

9. The in-ground water distribution assembly of claim 1, further comprising a feeder line directly connected with the water emitter, the feeder line in turn connected to a capped water supply line or source.

10. The in-ground water distribution assembly of claim 1, wherein the capture cup functions as a barrier to downward progression of ground water past the bottom wall of the capture cup.

11. The in-ground water distribution assembly of claim 1, wherein the at least one vertical support riser is a single substantially elongated and bowed rectangular piece having a top end and a bottom end, the bottom end seated in a respective riser seats arranged on the inside of a wall of the capture cup at one hundred and eighty degrees separation, each riser further including a hoop contiguous to or attached to the top for receiving the vertical feeder tube.

\* \* \* \* \*